United States Patent [19]

Linsten et al.

[11] Patent Number: 5,059,567
[45] Date of Patent: Oct. 22, 1991

[54] PROCESS FOR THE PREPARATION OF A MODIFIED ZEOLITE

[75] Inventors: Olof M. Linsten, Kungalv; Arne Ö. Frestad, Göteborg, both of Sweden

[73] Assignee: PQ Zeolite B. V., Leiden, Netherlands

[21] Appl. No.: 220,345

[22] Filed: Jul. 13, 1988

Related U.S. Application Data

[63] Continuation-in-part of Ser. No. 53,408, May 22, 1987, abandoned.

[30] Foreign Application Priority Data

May 22, 1986 [SE] Sweden ............................ 8602341

[51] Int. Cl.$^5$ ............................................ B01J 29/08
[52] U.S. Cl. ............................. 502/64; 502/79; 423/112
[58] Field of Search ................. 502/64, 79; 423/112

[56] References Cited

U.S. PATENT DOCUMENTS

| | | | |
|---|---|---|---|
| 3,455,842 | 7/1969 | Cornelius et al. | 252/455 |
| 3,595,611 | 7/1971 | McDaniel et al. | 23/111 |
| 4,224,188 | 9/1980 | Alafandi et al. | 252/455 |
| 4,357,265 | 11/1982 | Chiang | 252/455 |
| 4,415,439 | 11/1983 | Chiang | 502/79 |
| 4,419,271 | 12/1983 | Ward | 502/65 |
| 4,512,961 | 4/1985 | Scherzer et al. | 502/79 |
| 4,632,749 | 12/1986 | Hilfman | 502/79 |
| 4,663,025 | 5/1987 | Fu | 502/79 |

FOREIGN PATENT DOCUMENTS

| | | |
|---|---|---|
| 028938 | 12/1980 | European Pat. Off. . |
| 0131726 | 5/1984 | European Pat. Off. . |
| 0247679 | 5/1987 | European Pat. Off. . |
| 2492685 | 10/1981 | France . |
| 2014970A | 2/1979 | United Kingdom . |
| 2114594A | 2/1983 | United Kingdom . |

*Primary Examiner*—Carl F. Dees
*Attorney, Agent, or Firm*—Pennie & Edmonds

[57] ABSTRACT

Zeolite Y comprising aluminum ions supplied and fixed by ion-exchange is produced by subjecting zeolite NaY to a series of treatment steps comprising e.g. ammonium ion-exchange and calcination. In order to supply and fix the aluminum ions, an aluminum ion-exchange is carried out, followed by further calcination in a saturated or substantially saturated steam (water vapor) atmosphere at 400°–900° C. If the zeolite unit cell size is to be reduced to 24.15–24.35 Å, simultaneously as the aluminum ions are fixed, the last-mentioned calcination is carried out in a saturated or essentially saturated (steam) water vapor atmosphere at 500°–900° C. It is further disclosed that the steam used in the calcination step can be supplied either from an external source or solely by vaporization of water present in the zeolite.

27 Claims, 3 Drawing Sheets

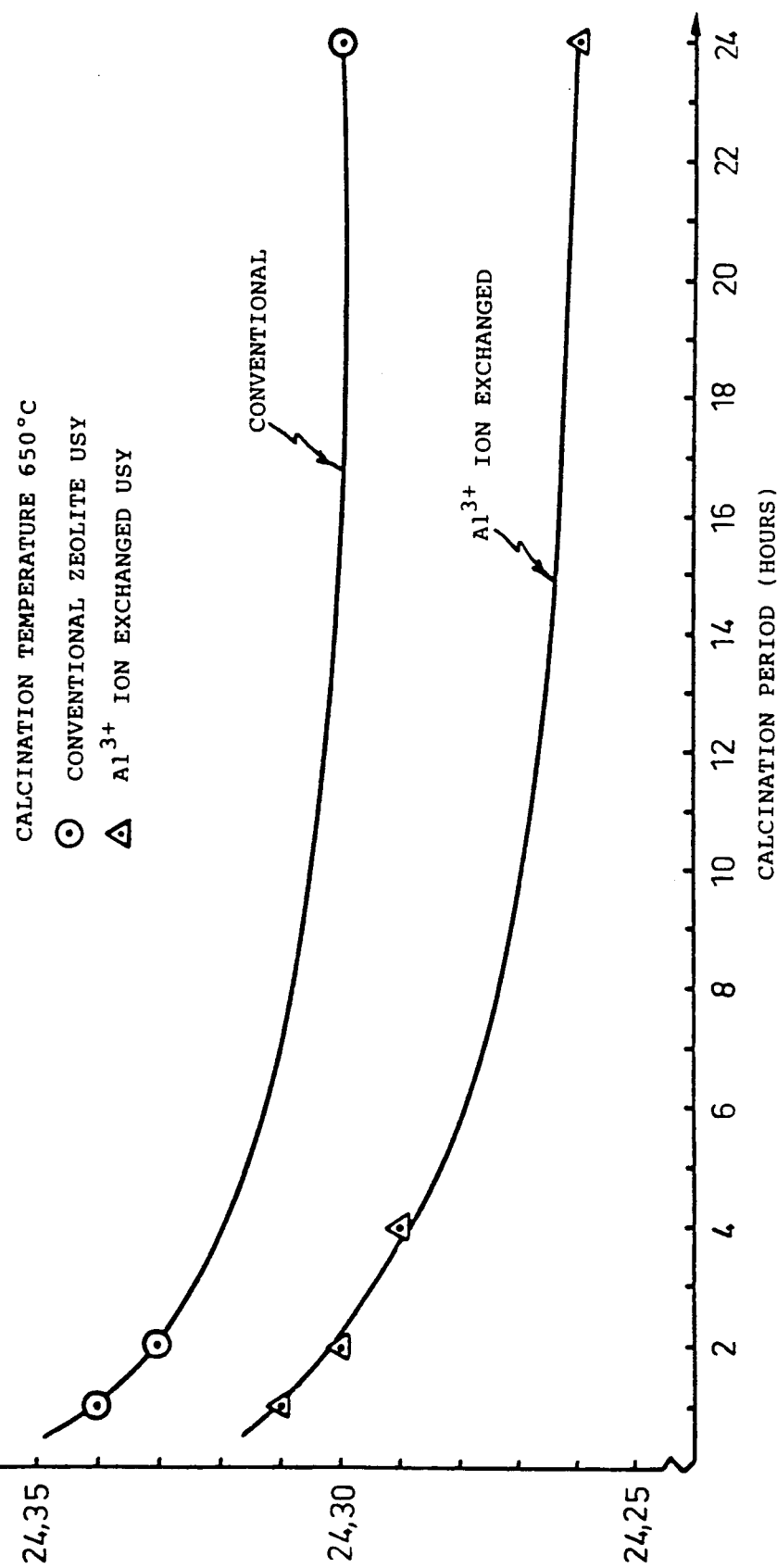

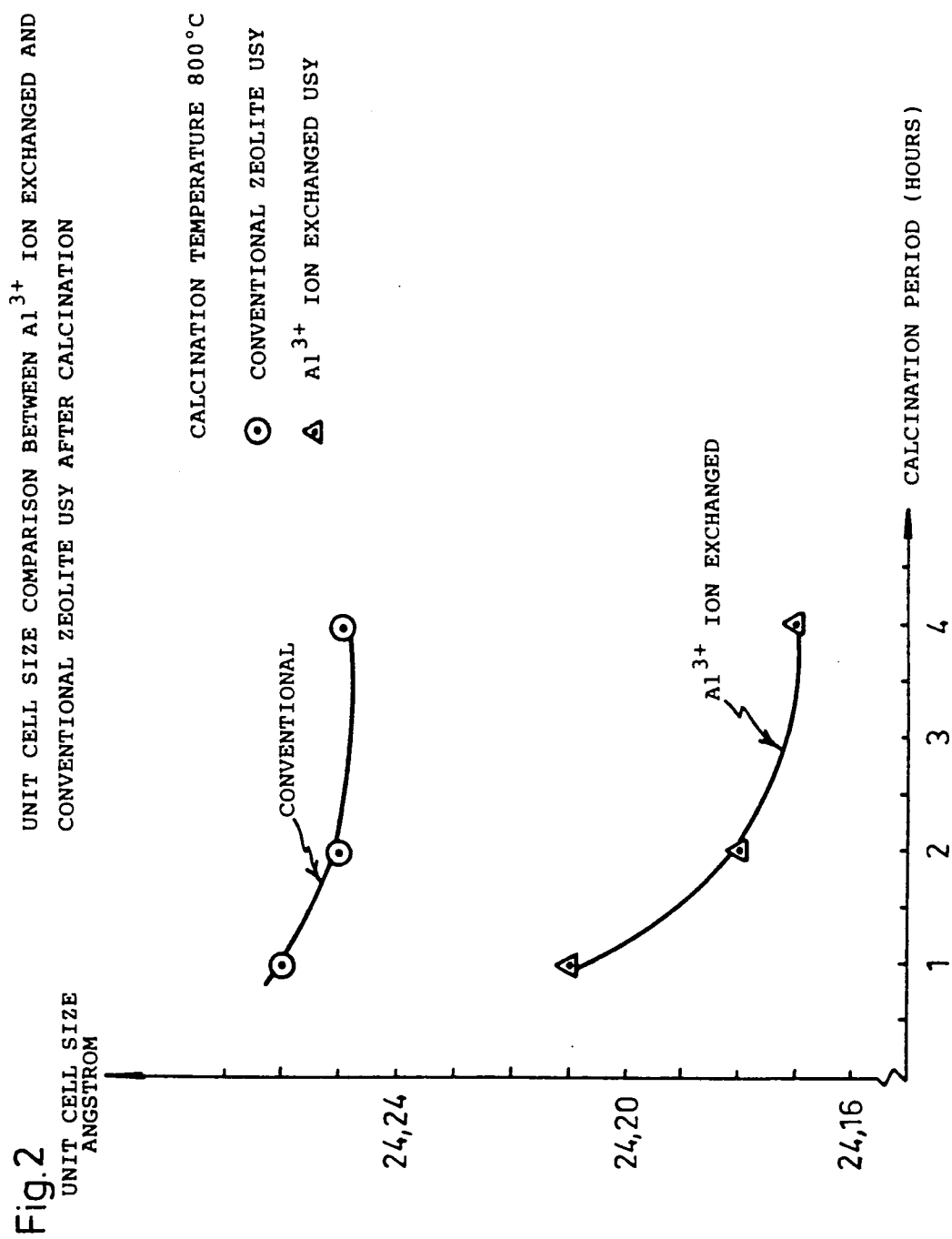

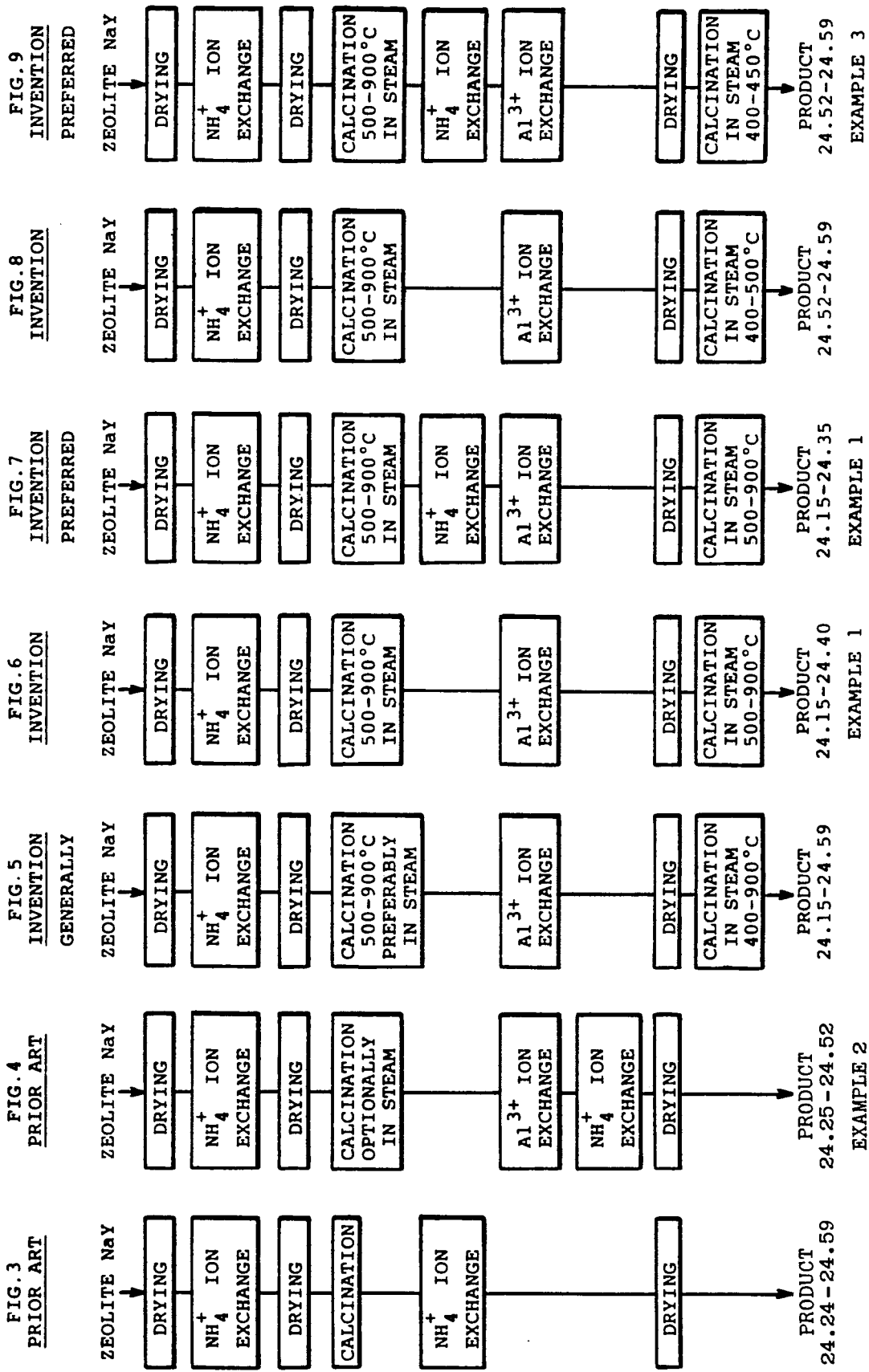

PROCESS FOR THE PREPARATION OF A MODIFIED ZEOLITE

This application is a continuation-in-part of U.S. patent application Ser. No. 07/053,408 filed May 22, 1987 and now abandoned.

TABLE OF CONTENTS

Background of the Invention
   Technical Field
   Description of Background Art
Summary of the Invention
Description of the Preferred Embodiments
   Example 1
   Example 2
   Example 3
   Example 4
   Example 5

BACKGROUND OF THE INVENTION

1. Technical Field

The present invention relates to a process for preparing a modified zeolite Y having increased stability and preferably also a small zeolite unit cell size.

2. Description of Background Art

In the application of zeolites, e.g. for catalysts for the processing of petroleum, especially for the production of so-called middestillates, it is known that an increased stability and, in particular, a small unit cell size dimension ($a_o$) improves the performance of the catalyst (compare for example U.S. Pat. No. 4,419,271). In view hereof, it has been endeavoured in different ways to increase the stability and, in particular, to reduce the unit cell size from the one obtained upon synthesizing (usually $a_o = 24.63-24.70$ Å) to as low a value as possible. Thus, GB-A-2,085,861 discloses how zeolite NaY can be modified by a combination of ammonium and aluminum ion-exchange steps It appears that this treatment is capable of increasing the catalyst activity and reducing the unit cell size to 24.45-24.52 Å. However, it was found that this production process gives a low residual ion-exchange degree in respect of the aluminum ions.

GB-A-2,014,970 discloses an ultrahydrophobic zeolite Y which has been given a unit cell size dimension $a_o$ of 24.20-24.45 Å by two ammonium ion-exchange steps with an intermediate calcination step at 550°-800° C. in steam (water vapor).

EP-B-0,028,938 discloses the use of such a modified zeolite for selective conversion of hydrocarbons boiling above 371° C. into midbarrel fuel products having a distillation range of 149°-371° C.

GB-A-2,114,594 describes the selective production of hydrocarbon middistillates by using, e.g. modified zeolite Y which has been calcined in steam at high temperature and has a unit cell size in the range 24.36-24.58 Å, especially below 24.40 Å.

SUMMARY OF THE INVENTION

The present invention is based upon the discovery that an increase in stability is obtainable by effecting calcination in steam (water vapor) wherein the steam can be supplied either from an external source or solely by vaporization of water present in the zeolite at 400°-900° C. after the ion-exchange steps, and that calcination at temperatures lower than 500° C., especially 400°-450° C., merely provides a stabilization, whereas calcination at 500°-900° C. also provides a further reduction of the unit cell size if, in addition to carrying out the ammonium and aluminum ion-exchange steps, the aluminum ion-exchange step is both preceded by ammonium ion-exchange and calcination steps and succeeded by a calcination step in an atmosphere saturated or substantially saturated with steam (water vapor) wherein the steam can be supplied either from an external source or solely by vaporization of water present in the zeolite at 500°-900° C. By conducting the process in this manner, one obtains the desired small unit cell size with fewer processing steps and/or shorter total processing times.

The invention thus makes it possible to reduce the unit cell size to values below 24.20 Å, which is remarkable.

In the conventional modification of zeolite Y according to GB-A-2,014,970 by a combination of ammonium ion-exchange and calcination steps, it is possible, upon calcination at 800° C. for 18 hours, to obtain a unit cell size of 24.25 Å. However, even if the calcination period is increased to 42 hours, the unit cell size cannot be reduced to below 24.25 Å. Calcination at 600° C. for 1-18 hours gives a unit cell size of down to about 24.35 Å. By utilizing the process according to the present invention, the desired reduction is obtained more quickly.

The characteristic features of the invention are stated in claim 1. If, in the utilization of the invention, fixation or stabilization alone is desired, the last calcination can be carried out at a low temperature of 400°-500° C., preferably 400°-450° C. The calcination period preferably is 0.25-5 hours, the shorter periods being useful for the higher temperatures. A calcination period below 0.25 hours gives an inferior effect, and calcination periods above 5 hours give no notably increased fixation effect. If both fixation and a reduction of the unit cell size are desired, the last calcination must be carried out at temperatures of at least 500° C., in which case the calcination period may be the same, i.e. 0.25-5 hours. The preferred calcination periods are periods of at least 45 min.

DESCRIPTION OF PREFERRED EMBODIMENTS

The invention is illustrated in the following non-limiting examples, reference being had to the accompanying drawings which, in FIGS. 1 and 2, illustrate comparisons between the invention and conventional technique and, in FIGS. 3-9 illustrate flow schedules.

FIGS. 3 and 4 show prior art techniques and
FIGS. 5-9 show examples of the invention.

EXAMPLE 1

In this example, zeolite NaY was produced in conventional manner from water, alumina, silica and sodium hydroxide. The resulting NaY zeolite had a $SiO_2/Al_2O_3$ molar ratio of 5.0 corresponding to 13.4% by weight $Na_2O$. This NaY zeolite which was used as starting material had a specific area of 800 m$^2$/g (BET:$p/p_o=0.15$) and a unit cell size $a_o$ of 24.67 Å (measured with XRD according to ASTM:D 3942-80).

The zeolite utilized as starting material was then ion-exchanged with a 10% ammonium sulphate solution to 2.8% by weight $Na_2O$ and then washed with deionized water until the washing water was sulphate-free. The zeolite was then dried at 100° C. to a total solids content of 80-90%, whereupon the dried zeolite was calcined in an atmosphere saturated with steam (water vapor) at 600° C. for 2 hours when the unit cell size had decreased to 24.52 Å.

The next treatment step comprised ion-exchange with ammonium sulphate and washing in the same manner as before to reduce the $Na_2O$ content to below 0.25% by weight, whereupon the zeolite thus treated was exposed to ion-exchange with an aluminum sulphate solution (concentration 0.1-8%, typically 5%) until the $(NH_4)_2O$ content of the zeolite had been reduced from 3.0-4.5 to below 1.5% by weight. For the results accounted for in the Tables below, the ion-exchange had been performed with an aluminum sulphate solution having a concentration of 8% by weight. The amount of $Al^{3+}$ in the solution per mole of ion-exchange sites in the zeolite was 8 moles.

Finally, the zeolite thus treated was dried and calcined at 500°-900° C. in an atmosphere saturated with steam to reduce the unit cell size to 24.15-24.35 Å. A flow schedule illustrating the process is shown in FIG. 7.

It was found that the final unit cell size after the aluminum ion-exchange and the subsequent calcination in steam was dependent on the amount of aluminum ions supplied by ion-exchange. The greater the amount of aluminum ions supplied by ion-exchange, the higher was the reduction of the unit cell size, with unchanged calcination conditions. Table 3 indicates the result of tests in which both the $Al^{3+}$ ion-exchange degree and the calcination period had been varied.

For comparison, conventional zeolite USY was produced by subjecting the NaY zeolite prepared as a starting material to washing with water, drying, ammonium ion-exchange, calcination, a further ammonium ion-exchange and finally drying (see FIG. 3). The calcination and ion-exchange steps were carried out in the same manner as above. To compare the known zeolite USY with the product according to the invention, the zeolite was subjected to a final calcination in steam at the temperatures stated in Table 4.

The results obtained in respect of the unit cell size $a_o$ under different conditions are shown in FIGS. 1 and 2 and in Tables 1 and 2.

As will appear from the results presented, unit cell sizes in the range 24.15-24.35 Å can be obtained more quickly if the process according to the invention is used.

TABLE 1

| Calcination conditions | | Unit cell size (Å) after calcination | |
|---|---|---|---|
| Time hours | Temperature °C. | Conventional USY | According to the invention |
| 1 | 650 | 24.34 | 24.31 |
| 2 | 650 | 24.33 | 24.30 |
| 4 | 650 | — | 24.29 |
| 24 | 650 | 24.30 | 24.26 |
| 1 | 800 | 24.26 | 24.21 |
| 2 | 800 | 24.25 | 24.18 |
| 4 | 800 | 24.25 | 24.17 |

Table 2 shows a comparison between two zeolites produced in accordance with the invention, one of which had been ammonium ion-exchanged and calcined at 650° C. prior to the aluminum ion-exchange (FIG. 8), whereas the starting material for the other zeolite consisted of the conventional zeolite USY produced in conventional manner in accordance with the above and subjected, after the final drying step, to aluminum ion-exchange followed by calcination in an atmosphere saturated with steam and having the temperature 650° C. (FIG. 9). It appears from Table 2 that the same results are obtained regardless of whether or not ammonium ion-exchange is carried out between the calcination in a steam atmosphere and the aluminum ion-exchange.

TABLE 2

| | Unit cell size (Å) | |
|---|---|---|
| Calcination time (hours) | $Al^3$ ion-exchanged USY (FIG. 6) | $Al^3$ ion-exchanged $NH_4Y$ (FIG. 7) |
| 1 | 24.31 | 24.31 |
| 2 | 24.30 | 24.30 |

TABLE 3

| $Al^{3+}$ ion-exchange degree (%) | Unit cell size (Å) after calcination at 650° C. | |
|---|---|---|
| | 1 hour | 2 hours |
| 0 | 24.34 | 24.33 |
| 44 | 24.34 | — |
| 47 | — | 24.32 |
| 52 | 24.33 | — |
| 58 | 24.32 | — |
| 64 | 24.31 | — |
| 72 | — | 24.31 |
| 83 | — | 24.30 |
| 87 | — | 24.29 |
| 89 | — | 24.28 |

EXAMPLE 2

Comparison

In this comparison example, a thermally stabilized aluminum ion-exchanged zeolite Y was produced essentially in accordance with the directions given in Example 1 of GB-A-2,085,861.

As starting material, the same zeolite NaY as in Example 1, above, was used, and this starting material was treated in accordance with step (a) by three ion-exchange steps, each lasting 30 minutes at 60°-80° C. with an ammonium sulphate solution containing 10% by weight ammonium sulphate. After this ion-exchange the zeolite contained 3.2% by weight $Na_2O$. Calcination was then carried out at 650° C. for 3 hours to produce a calcined product. The product was then treated exactly in accordance with steps (b) and (c) in Example 1 of GB-A-2,085,861, i.e. in step (b) the product was first treated with a 0.05M aluminum sulphate solution for 45 minutes at pH 3.3, followed by two ion-exchange treatments with diluted ammonium sulphate solution The ammonium sulphate solution contained 10% by weight ammonium sulphate and was utilized for each treatment during 30 minutes at the temperature 60°-80° C. The treatment schedule thus corresponds to the schedule according to FIG. 4 in the accompanying drawings.

For use as a reference sample, a further batch of the starting material was treated in accordance with step (a), but then only two ammonium ion-treatments were carried out, each lasting 30 minutes at 60°-80° C. with the same diluted ammonium sulphate solution. The resulting reference sample of the product contained 0.42% by weight $Na_2O$ and had a unit cell size of 24.52 Å and a $SiO_2/Al_2O_3$ molar ratio of 5.0. This treatment schedule corresponds essentially to the schedule according to FIG. 3 in the accompanying drawings.

The properties measured for the different products are indicated in Table 4 which also contains values taken from Example 1 in GB-A-2,085,861. Table 5 indicates the $Al^{3+}$ ion-exchange degree after steps (b) and (c). The ion exchange degree has been calculated on the assumption that all available ion-exchange sites have been occupied by ammonium and sodium ions in the reference sample, and that only the aluminum and sodium ions have been affected by the ammonium ion-exchanges under steps (b) and (c). The number of moles of ammonium and sodium ions in the reference sample and the products after the aluminum ion-exchanges and also after the two ammonium ion-exchanges in step (b) and (c) was determined and used for calculation of the percentages in Table 5.

The results indicate that the two ammonium ion-exchanges had caused the major part or all of the aluminum previously ion-exchanged into the zeolite to be ion-exchanged out of the zeolite. The variations in the ion-exchange degree presumably are due to crystallization changes as well as changes in the unit cell sizes. The residual amount of aluminum in the ion-exchange position is not enough to have an effect upon the unit cell size.

TABLE 4

|  | Example 1, GB-A-2,085,861 | | | Present Example 2 | | |
|---|---|---|---|---|---|---|
|  | Step (a) | Step (b) | Step (c) | Step (a) | Step (b) | Step (c) |
| Unit cell size, Å | 24.49 | — | — | 24.50 | 24.51 | 24.50 |
| Na$_2$O, % wt | 3.55 | 0.26 | 0.25 | 3.2 | 0.25 | 0.16 |
| Molar ratio SiO$_2$/Al$_2$O$_3$ | 5.2 | 5.3 | 8.5 | 5.0 | 5.0 | 8.0 |

TABLE 5

|  | After step (b) | After step (c) |
|---|---|---|
| Al$^{3+}$ ion-exchange degree after Al$^{3+}$ ion-exchange, % | 80 | 88 |
| Al$^{3+}$ ion-exchange degree after the two NH$_4^+$ ion-exchanges, % | 0-20 | 0-20 |
| Unit cell size (Å) after Al$^{3+}$ and NH$_4^+$ ion-exchanges | 24.48-24.51 | 24.48-24.50 |

EXAMPLE 3

This example illustrates how it is possible, by utilizing the present invention, to fix the aluminum ions supplied by ion-exchange without appreciably affecting the unit cell size.

Example 1 was repeated, except that the final calcination in steam was carried out at 400°–450° C. for 45 minutes in making the product according to the invention, i.e. production was carried out according to the schedule of FIG. 9. For check analysis, the conventional comparison zeolite USY was subjected to the same steam calcination and to one ammonium ion-exchange for 30 minutes at 60°–80° C. with an ammonium sulphate solution containing 10% by weight ammonium sulphate. The results are shown in Table 6.

The results in Table 6 show that, for a conventional zeolite USY, all NH$_4^+$ that has been driven off during the steam calcination can be reintroduced by ion-exchange, whereas only a part of the ion-exchange sites can be reoccupied by Na$^+$ in using the present invention, i.e. when Al$^{3+}$ ion-exchange is carried out between the NH$_4^+$ and the steam calcination at 400°–450° C. The remaining ion-exchange sites are occupied by Al$^{3+}$ ions fixed during the steam calcination. The difference in the unit cell size presumably is due to the Al$^{3+}$ ion-exchange.

TABLE 6

|  | Conventional USY | Modified USY (the invention) |
|---|---|---|
| After the second NH$_4^+$ ion-exchange: | | |
| Unit cell size, Å | 24.59 | 24.59 |
| (NH$_4$)$_2$O content, % by weight | 4.0 | 4.0 |
| After the Al$^{3+}$ ion-exchange: | | |
| Unit cell size, Å | — | 24.57 |
| (NH$_4$)$_2$O content, % by weight | — | 0.8 |
| After calcination at 400–450° C.: | | |
| Unit cell size, Å | 24.59 | 24.56 |
| (NH$_4$)$_2$O content, % by weight | 4.0 | 0.8 |
| After the third NH$_4^+$ ion-exchange: | | |
| Unit cell size, Å | 24.59 | 24.56 |
| (NH$_4$)$_2$O content, % by weight | 4.0 | 2.6 |
| NH$_4^+$ ion-exchange degree, % | 100 | 62 |

EXAMPLE 4

This example illustrates that by utilizing steam solely from vaporization of water present in the zeolite and not from an external source during the first calcination step in the present invention, a zeolite product with similar properties as in Example 1 is obtained.

A zeolite NaY with a SiO$_2$/Al$_2$O$_3$ ratio of 4.8 and a unit cell size of 24.68 Å was ion-exchanged with an ammonium sulphate solution as described in Example 1 to a Na$_2$O content of 3.0–4.0% by weight. The zeolite was then washed and dried to a total solids content of about 70–75%. Finally the zeolite was calcined in steam supplied solely from vaporization of the water from the zeolite at about 600° C. for 2 hours. For comparison, the above procedure was repeated except that the zeolite was calcined in steam supplied from an external source. The results obtained in respect of the unit cell size as under different calcination conditions are shown in Table 7.

TABLE 7

| CALCINATION CONDITION | | | |
|---|---|---|---|
| Steam supplied solely from vaporization of water present in the zeolite | | Steam supplied from an external source | |
| Na$_2$O [% wt] | unit cell size Å | Na$_2$O [% wt] | unit cell size Å |
| 4.0 | 24.57 | 3.9 | 24.54 |
| 3.4 | 24.53 | 3.4 | 24.52 |
| 3.0 | 24.51 | 2.7 | 24.51 |

EXAMPLE 5

This Example 5 illustrates that by utilizing steam solely from vaporization of water present in the zeolite alone and not from an external source during the first and second calcination steps in the present invention, a zeolite product with similar properties as in Example 1 is obtained.

A zeolite NaY was treated in the same way as described in Example 1 except that the zeolite was calcined in steam supplied solely from vaporization of water present in the zeolite. The second calcination was carried out at about 650° C. for 2 hours. The results obtained in respect of the unit cell size after calcining the zeolite in steam supplied solely from vaporization of water present in the zeolite are shown in Table 8.

TABLE 8

| Al$^{3+}$ ion exchange degree (%) | Unit cell size (Å) after calcination in steam supplied solely from vaporization of water present in zeolite |
| --- | --- |
| 76 | 24.32 |
| 78 | 24.30 |
| 85 | 24.29 |

In the above examples, ammonium sulphate and aluminum sulphate have been used in the ion-exchange steps. It will be appreciated by those skilled in the art that other salt forms may also be used, for example chlorides and nitrates.

In the examples, an atmosphere saturated with steam (water vapor) has been utilized for the calcination. However, it is possible, although the result will not be as good, to effect calcination in an atmosphere which is not completely saturated with steam (water vapor).

We claim:

1. An improved process for the production of a modified zeolite Y comprising aluminum ions supplied and fixed by ion-exchange and preferably also having a small unit cell size, in which process NaY zeolite is prepared and subjected to a series of treatment steps comprising ammonium ion-exchange, calcination, aluminum (III) ion-exchange and drying, the improvement which comprises subjecting the zeolite, after the aluminum (III) ion-exchange step, to a further calcination step, at least the last-mentioned calcination step being carried out in a steam atmosphere at 400°–900° C. to fix the aluminum ions supplied by ion-exchange.

2. A process as claimed in claim 1, wherein said last-mentioned calcination step is carried out at 500°–900° C. for decreasing the unit cell size to 21.15–24.35 Å in dependence on the amount of aluminum supplied by ion-exchange.

3. A process as claimed in claim 1, wherein the aluminum ion-exchange is carried out until the (NH$_4$)$_2$O content of the zeolite has been reduced to below 1.5% by weight.

4. A process as claimed in claim 1, wherein the ammonium ion-exchange is carried out with a compound selected from the class consisting of ammonium chloride, ammonium nitrate and ammonium sulphate.

5. A process claimed in claim 1, wherein the aluminum ion-exchange is carried out with a compound selected from the class consisting of aluminum chloride, aluminum nitrate and aluminum sulphate.

6. A process as claimed in claim 1, wherein calcination is carried out in an atmosphere saturated with steam.

7. A process as claimed in claim 1, wherein the aluminum ion-exchange is carried out on an ultrastable zeolite Y.

8. A process as claimed in claim 1, wherein the NaY zeolite is first ammonium ion-exchanged and then calcined in an atmosphere saturated with steam, whereupon it is ammonium ion-exchanged and aluminum ion-exchanged and finally calcined in an atmosphere saturated with steam.

9. A process as claimed in claim 1, wherein the last-mentioned calcination is carried out at a temperature of 400°–500° C.

10. A process as claimed in claim 1, wherein the calcination carried out prior to the aluminum ion-exchange is carried out at 500°–900° C.

11. The process as claimed in claim 1, wherein the last mentioned calcination step is carried out at a temperature of 400°–450° C.

12. The process as claimed in claim 1, wherein the calcination carried out prior to the aluminum ion-exchange is carried out at 550°–750° C.

13. The process as claimed in claim 1, wherein the steam is supplied solely from vaporization of the water present in the zeolite.

14. The process as claimed in claim 6, wherein the steam is supplied solely from vaporization of the water present in the zeolite.

15. The process as claimed in claim 8, wherein the steam is supplied solely from vaporization of the water present in the zeolite.

16. A process as claimed in claim 2, wherein the aluminum ion-exchange is carried out until the (NH$_4$)$_2$O content of the zeolite has been reduced to below about 1.5% by weight.

17. A process as claimed in claim 2, wherein the ammonium ion-exchange is carried out with a compound selected from the group consisting of ammonium chloride, ammonium nitrate and ammonium sulphate.

18. A process claimed in claim 2, wherein the aluminum ion-exchange is carried out with a compound selected from the group consisting of aluminum chloride, aluminum nitrate and aluminum sulphate.

19. A process as claimed in claim 2, wherein calcination is carried out in an atmosphere saturated with steam.

20. A process as claimed in claim 2, wherein the aluminum ion-exchange is carried out on an ultrastable zeolite Y.

21. A process as claimed in claim 2, wherein the NaY zeolite is first ammonium ion-exchanged and then calcined in an atmosphere saturated with steam, whereupon it is ammonium ion-exchanged and aluminum ion-exchanged and finally calcined in an atmosphere saturated with steam.

22. A process as claimed in claim 2, wherein the calcination carried out prior to the aluminum ion-exchange is carried out at 500°–900° C.

23. The process as claimed in claim 2, wherein the calcination carried out prior to the aluminum ion-exchange is carried out at 550°–750° C.

24. In a process for the production of a modified zeolite Y comprising subjecting a NaY zeolite to a series of treatment steps comprising ammonium ion-exchange, calcination, aluminum ion-exchange and drying, the improvement which comprises subjecting the zeolite, after the aluminum (III) ion-exchange step, to a further calcination step, at least the last-mentioned calcination step being carried out at 400°–900° C. in a steam atmosphere wherein the steam is supplied solely from vaporization of the water present in the zeolite.

25. A process as claimed in claim 24, wherein calcination is carried out in an atmosphere saturated with steam.

26. A process as claimed in claim 24, wherein the calcination is carried out at a temperature of 400°–500° C.

27. The process as claimed in claim 24, wherein the calcination step is carried out at a temperature of 400°–450° C.

* * * * *